W. J. GREENING.
MEANS FOR LUBRICATING AXLES, BEARINGS, AND THE LIKE.
APPLICATION FILED NOV. 11, 1908.
962,955.
Patented June 28, 1910.
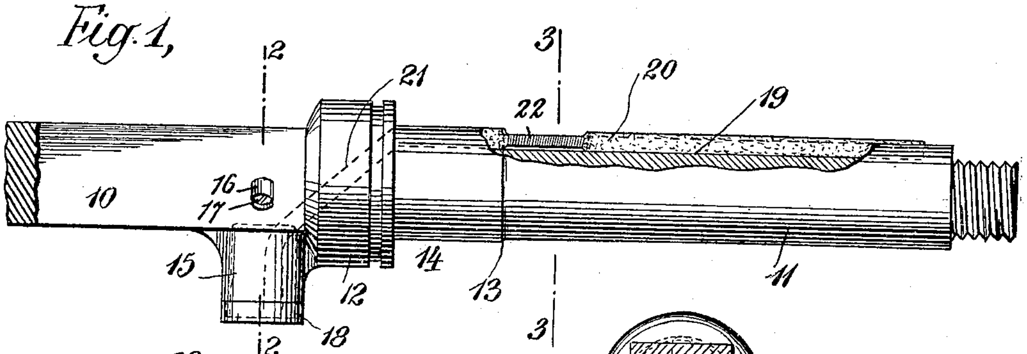
Fig. 1,
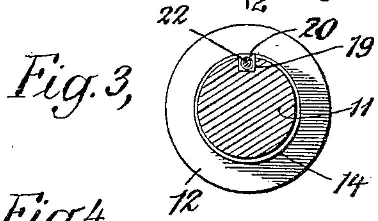
Fig. 3,
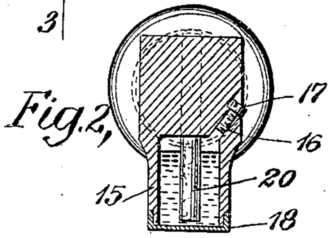
Fig. 2,
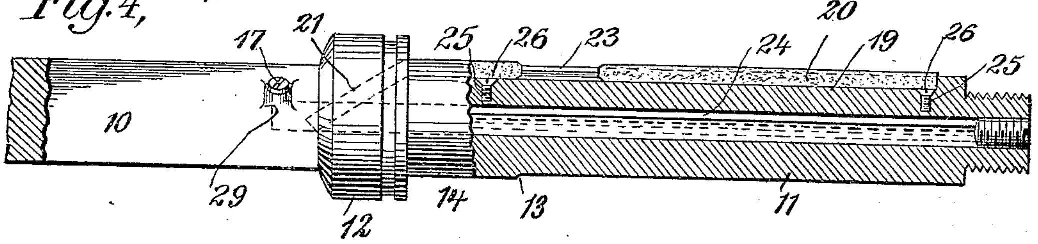
Fig. 4,
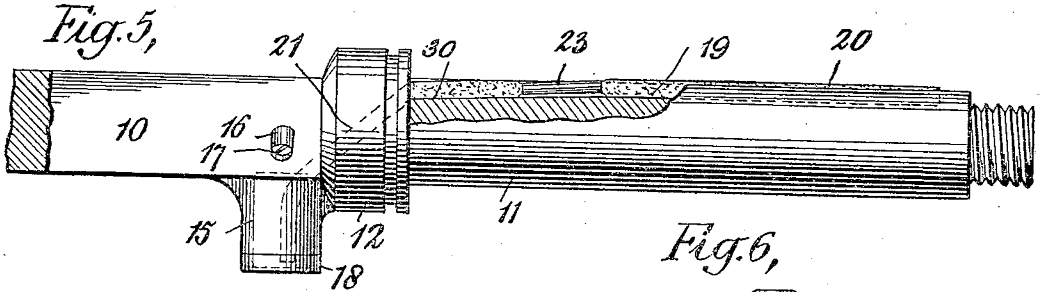
Fig. 5,
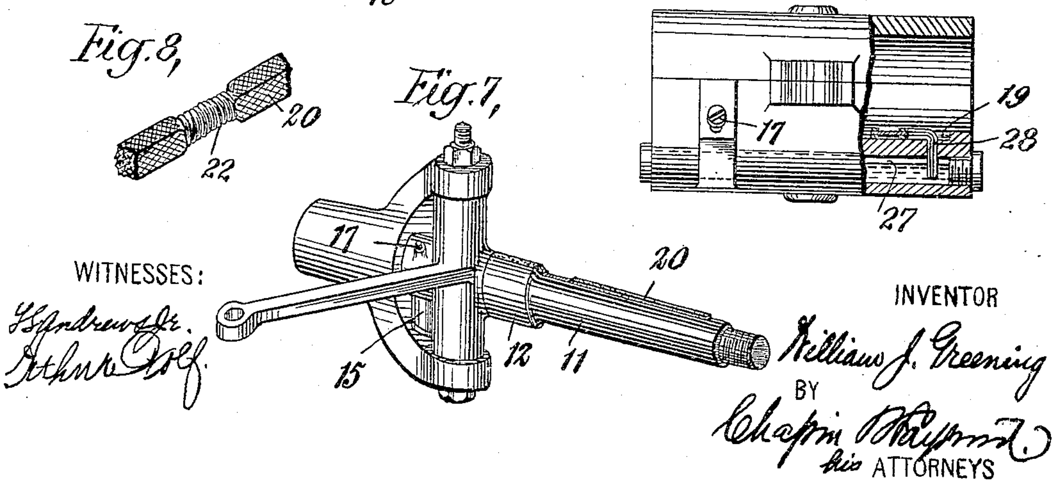
Fig. 8, Fig. 6, Fig. 7,
WITNESSES:
F. S. Andrews Jr.
Arthur Wolf
INVENTOR
William J. Greening
BY
Chapin & Raymond
his ATTORNEYS

UNITED STATES PATENT OFFICE.

WILLIAM J. GREENING, OF MIDDLETOWN, NEW YORK.

MEANS FOR LUBRICATING AXLES, BEARINGS, AND THE LIKE.

962,955. Specification of Letters Patent. Patented June 28, 1910.

Application filed November 11, 1908. Serial No. 461,995.

*To all whom it may concern:*

Be it known that I, WILLIAM J. GREENING, a citizen of the United States of America, and a resident of Middletown, in the county of Orange and State of New York, have invented certain new and useful Improvements in Means for Lubricating Axles, Bearings, and the Like, of which the following is a specification, reference being had to the accompanying drawings, forming a part thereof.

My invention relates to means for lubricating axles, bearings and the like, and particularly to that class of lubricating means which includes a reservoir for the lubricant and a wick for conveying lubricating material from the reservoir to the surfaces to be lubricated.

My invention consists, first, in improvements in the means for regulating the flow of the lubricating material along the wick; second, in an improved construction whereby the lubricant is more evenly distributed, and the flooding of the bearing near the inner or shouldered end thereof is prevented, and third, in certain improved details of construction and combination of parts as will hereinafter be more fully pointed out.

The main object of my invention is the thorough lubrication of bearing surfaces with a minimum of lubricant, the complete protection of the parts, the rendering of the reservoir readily accessible for filling purposes while disposing of the said reservoir in such a position as to be well out of the way, and in the efficient regulation of the supply of lubricant to the bearing surfaces as will be fully set forth hereinafter.

In order that my invention may be thoroughly understood, I will now proceed to describe certain structures constituting embodiments thereof, having reference to the accompanying drawings illustrating the same, and will then point out the novel features in claims.

In the drawings: Figure 1 is a view in side elevation of an axle provided with a lubricating means embodying my invention, certain parts thereof being broken away in section. Fig. 2 is a view in cross section thereof upon the line 2—2 of Fig. 1. Fig. 3 is a view in cross section thereof along the line 3—3 of Fig. 1. Figs. 4 and 5 are views in partial side elevation, and partial central longitudinal section showing certain modified embodiments of my invention. Fig. 6 is a view in partial side elevation and partial central longitudinal section of a bearing provided with lubricating means embodying my invention. Fig. 7 is a view in perspective of a motor car axle and steering knuckle in which my invention is employed. Fig. 8 is a detail view in perspective of a portion of the wick employed, showing particularly the means for retarding the flow of lubricating material along the same.

In Figs. 1 to 5 and 7, I have shown my invention as applied to carriage or wagon axles, but it will of course be understood that such application is but one of the many of which my invention is capable, the invention being equally applicable to rotating bodies, such as shafts, wheels and the like, and furthermore, it is evident that the lubricating means may be applied to the bearing member instead of the shaft member, an example thereof being shown in Fig. 6 of the drawings.

Referring first of all to Figs. 1, 2 and 3, the axle therein comprises a body portion 10, a spindle 11, and a collar 12. The spindle is shouldered at 13, the portion 14 between the shouldered part 13 and the collar 12 being of somewhat larger diameter than that of the main portion of the spindle 11. The body portion 10 is rectangular in cross section as is common in wagon axles, and is provided at the lower side thereof, behind the collar 12, with a closed reservoir 15. This reservoir 15 may be reached for filling purposes through an opening 16 which is normally closed by means of a screw 17. For convenience of manufacture, the lower portion of the reservoir may be constructed in the form of a cap 18 but the said cap is designed to be permanently attached in position upon the body portion 15 of the reservoir, as by being shrunk, brazed, welded or soldered permanently in position in the process of manufacture. I find it necessary to thus permanently close the reservoir because of the fact that the lubricating material which the reservoir is designed to contain will work out through very small openings, and if the cap is made removable in any sense, the lubricant is apt to work out through the joint. It will be noted that the filling opening 16 connects with the interior of the reservoir through the side of the axle body and at the rear of the collar. This position is important for the reason of the fact that substantially the whole of the collar is usually covered by the wheel hub, while the upper part of the rectangular body portion bears against some member connected with the body of the vehicle. The placing of the opening in the side of the axle thus renders it readily accessible at all times, such as would be practically impossible if the opening were located anywhere else. The axle is provided with a longitudinal groove 19 which is recessed from the upper surface of the spindle, and a wick 20 is provided in the said groove, the end of said wick passing through a channel 21 into the said reservoir 15. The wick carries the lubricating material by capillary attraction from the reservoir to the surface of the axle, at which point it is distributed over the bearing surface by the rotation of the member in contact therewith. The depth of the groove 19 near the collar 12 is preferably somewhat greater than the depth of the groove along the main portion of the spindle 11. The depth at or near the collar 12 is preferably such that the wick contained in the groove will not extend beyond the surface of the spindle at this point while the depth along the main body portion of the spindle is preferably such that normally the wick tends to extend slightly above the said body portion, all as is clearly shown in the drawings. In the construction shown in Fig. 1, the bottom of the groove is substantially a straight line which is parallel with the surface of the main body portion of the spindle 11, the portion 14 being of somewhat larger diameter, causing the groove to be thereby deeper at this point. In the example of my invention shown in Fig. 5, in which there is no portion of the spindle of greater diameter, corresponding to the portion 14, the base of the groove 19 is lowered at 30 in proximity to the collar 12 in order to accomplish the same purpose. I have found in actual practice that where the groove in the axle is of even depth throughout, said depth being substantially equal to the thickness of the wick employed, the tendency is toward an excess of oil being delivered near the collar of the axle which is promptly wiped off by the wheel hub in its revolution, such oil being then caused to work out at the inside of the wheel hub and be wasted, while the other end of the axle is insufficiently supplied with the lubricant. By deepening the groove at the end at which the lubricant is first admitted, whereby the top of the wick is lowered below the bearing surface of the axle, such flooding is avoided and an equal distribution of the lubricating material is insured.

The wick is preferably provided at a certain point therein with means for retarding the flow of oil. This means may conveniently consist of a metallic element wrapped around the wick to compress the same, the said metallic element comprising a piece of wire 22 coiled around the wick, or a strip of metal 23 pinched thereon; or other means may be provided for the same purpose. As a result of actual experiment, I have found that it is advantageous to have a wick of considerable capacity to carry the lubricating material up from the reservoir to the bearing surface, and also a wick of considerable capacity to properly distribute the lubricating material, but I have found it very advantageous to lessen, restrict or retard the flow of lubricating material at a certain point so as to prevent too large a quantity from passing in a given time. By restricting or retarding the flow at a point where the distributing portion of the wick joins in with the portion which conveys the lubricating material to the bearing surface, I do not interfere with the free flow of the lubricating material to the bearing surface, nor do I prevent an even and thorough distribution of the lubricating material along the surface, but it will be readily understood that by reducing the wick at this point in any manner as by surrounding it tightly with metal, or otherwise, I can readily limit the flow of lubricating material to just the required quantity.

In Fig. 4 of the drawings, I have shown a structure in which the reservoir is formed within the spindle, a central bore 24 being formed longitudinally therein for such purpose. This central bore has a lateral opening 29 thereto, formed at the rear of the collar 12, similar to the opening 16 shown in the construction of Fig. 1, and is provided with a similar screw 17 to close the same. I have also provided lateral vent openings 25—25 between the base of the groove 19 and the said reservoir, said openings being closed by means of screws 26, the heads of which lie flush with the bottom of the groove 19 and are covered by the wick.

In Fig. 6 I have shown a bearing provided with a lubricating device similar to that shown in the other figures, the reservoir 27 therein being formed in an opening located beneath the bearing surface, and a wick 28 conveys the lubricating material from the reservoir to the bearing surface as will be well understood by reference to the drawings.

In Fig. 7 I have shown my improved lubricating device as applied to a steering knuckle of the type employed in motor vehicles. The form and construction of the elements which constitute the lubricating means is similar to that shown in Figs. 1, 2, and 3 of the drawings.

What I claim is:

1. The combination with an element having a bearing surface and having a groove therein, and a reservoir for lubricating material located in proximity to the bearing surface, of a wick, one portion of which is located in said groove and another portion whereof is contained in the said reservoir, the said wick including and carrying therewith means located between the two said portions for retarding the flow of lubricating material along the same.

2. The combination with an element having a bearing surface and having a groove recessed from such surface, and a reservoir for lubricating material located in proximity to the said surface, but below the level of the said groove, of a wick for conveying lubricating material from the reservoir up to the groove, and located in the groove, the upper level of the wick for a short distance at that portion of the groove where the lubricating material is first admitted being lower with respect to the bearing surface than throughout the remainder of the groove.

3. The combination with a wagon axle comprising a body portion, a collar, and a spindle, the said spindle being provided with a groove recessed from the bearing surface of the spindle, the said groove being of substantially uniform depth throughout except for a short distance near the collar, at which it is deeper than at the remaining portion, of a reservoir located in proximity to the groove but below the level thereof, and a wick located in part in the said reservoir and in part throughout the said groove, adapted to convey lubricating material from the reservoir up to and along the said groove, the said wick being of substantially the same thickness throughout the portion thereof in the groove, whereby the upper level thereof will be lower with respect to the surface at the deeper portion of the groove than at the remaining portion thereof.

4. The combination with a wagon axle comprising a body portion, a collar, and a spindle, the said spindle being provided with a groove recessed from the bearing surface of the spindle, the said groove being of substantially uniform depth throughout except for a short distance near the collar, at which it is deeper than at the remaining portion, of a reservoir located in proximity of the groove but below the level thereof, and a wick located in part in the said reservoir and in part throughout the said groove, adapted to convey the lubricating material from the reservoir up to and along the said groove, the said wick being of substantially the same thickness throughout the portion thereof in the groove, whereby the upper level thereof will be lower with respect to the surface at the deeper portion of the groove than at the remaining portion thereof, and the said wick being provided with means located at substantially the junction of the deeper and shallower portions of the groove, for retarding the flow of lubricating material along the same.

WILLIAM J. GREENING.

Witnesses:
D. Howard Haywood,
Lyman S. Andrews, Jr.